Aug. 4, 1959     J. S. BECKETT     2,898,533
COMPENSATING TIMER
Filed Dec. 12, 1955     3 Sheets-Sheet 1

INVENTOR
JOHN S. BECKETT
BY
ATTORNEY

Aug. 4, 1959

J. S. BECKETT 2,898,533

COMPENSATING TIMER

Filed Dec. 12, 1955

INVENTOR
JOHN S. BECKETT
BY

ATTORNEY

Aug. 4, 1959 J. S. BECKETT 2,898,533
COMPENSATING TIMER
Filed Dec. 12, 1955 3 Sheets-Sheet 3

INVENTOR
JOHN S. BECKETT
BY
ATTORNEY

United States Patent Office 2,898,533
Patented Aug. 4, 1959

2,898,533

COMPENSATING TIMER

John S. Beckett, Los Angeles, Calif., assignor to Aseptic Thermo Indicator Company, North Hollywood, Calif., a corporation of California Application December 12, 1955, Serial No. 552,521

4 Claims. (Cl. 318—171)

This invention relates to a compensating timer means for controlling processing operations.

In many industrial processes, the proper length of processing time is a function of some other variable operational condition such as temperature, pressure, fluid flow, electric current, voltage, and the like. It is often difficult or expensive to use accurate controls for such factors. I have found that under such conditions the timer means for the process may be arranged to automatically compensate for the variations in the other factors during the processing period.

For example, in processing canned food products, it is required to expose the canned food in a steam retort at a certain temperature for a certain period of time in order to destroy all bacterial life. At a somewhat lower temperature, a longer time is required. At a higher temperature, a shorter time is required. In this case, the relation between time and temperature is quite definite and may be expressed by saying that the required time ($t$) is an integrated function of the temperature (T) throughout the run.

$$dt = f(T) dt$$

where $f(T)$ is a time function of T throughout the run.

The importance of accurate control is easily seen when it is realized that a sterilizing process, for example, one that calls for 90 minutes at 250° F. to assure a sterile product, will require 115 minutes to assure the same sterility with a temperature of 245° F. In the latter case, a 90 minute process may well result in a product which is dangerous to health.

A very simple diaphragm pressure control will serve to hold the retort temperature constant within five or six degrees Fahrenheit, but to secure a control of less than one degree would involve expensive equipment costing several thousand dollars.

While it is usually difficult and expensive to control within close tolerance most of the other process variables, it is a relatively simple matter to regulate the timing so as to compensate for other variations.

The principal object of the invention is to provide compensating timer means for controlling the duration of process where another variable factor enters into the proper time of completion of a process. Another object is to provide means for controlling the duration of a process where a plurality of other variable factors enter into the proper time of completion of a process.

These and other objects are attained by my invention which will be understood from the following description, reference being made to the accompanying drawings illustrating my invention, in which.

Figure 1:
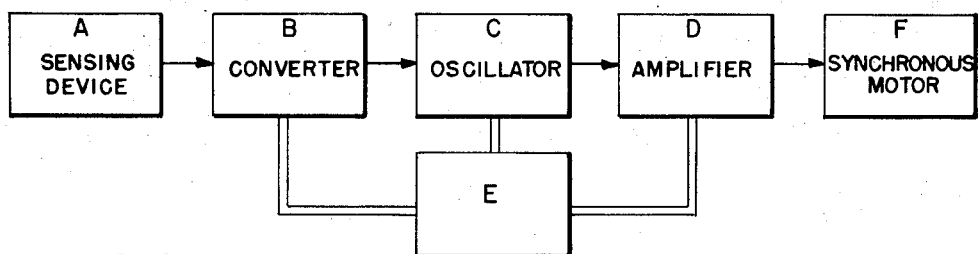
Fig. 1 is a block diagram of a compensating timer means.

Referring to the drawings, a preferred embodiment of my invention is represented in Fig. 1, which consists of a signal generator or sensing device A; a converter B for changing the signal generated in A to a variable direct current voltage; an electronic astable oscillator or multivibrator C for varying the output frequency in functional relation to the intensity of the signal generator in A; an electronic amplifier D; a power source E for actuation of B, C and D; and a synchronous motor means F whose rotations per unit of time is governed by the frequency of the output of the multivibrator C.

Figure 2:
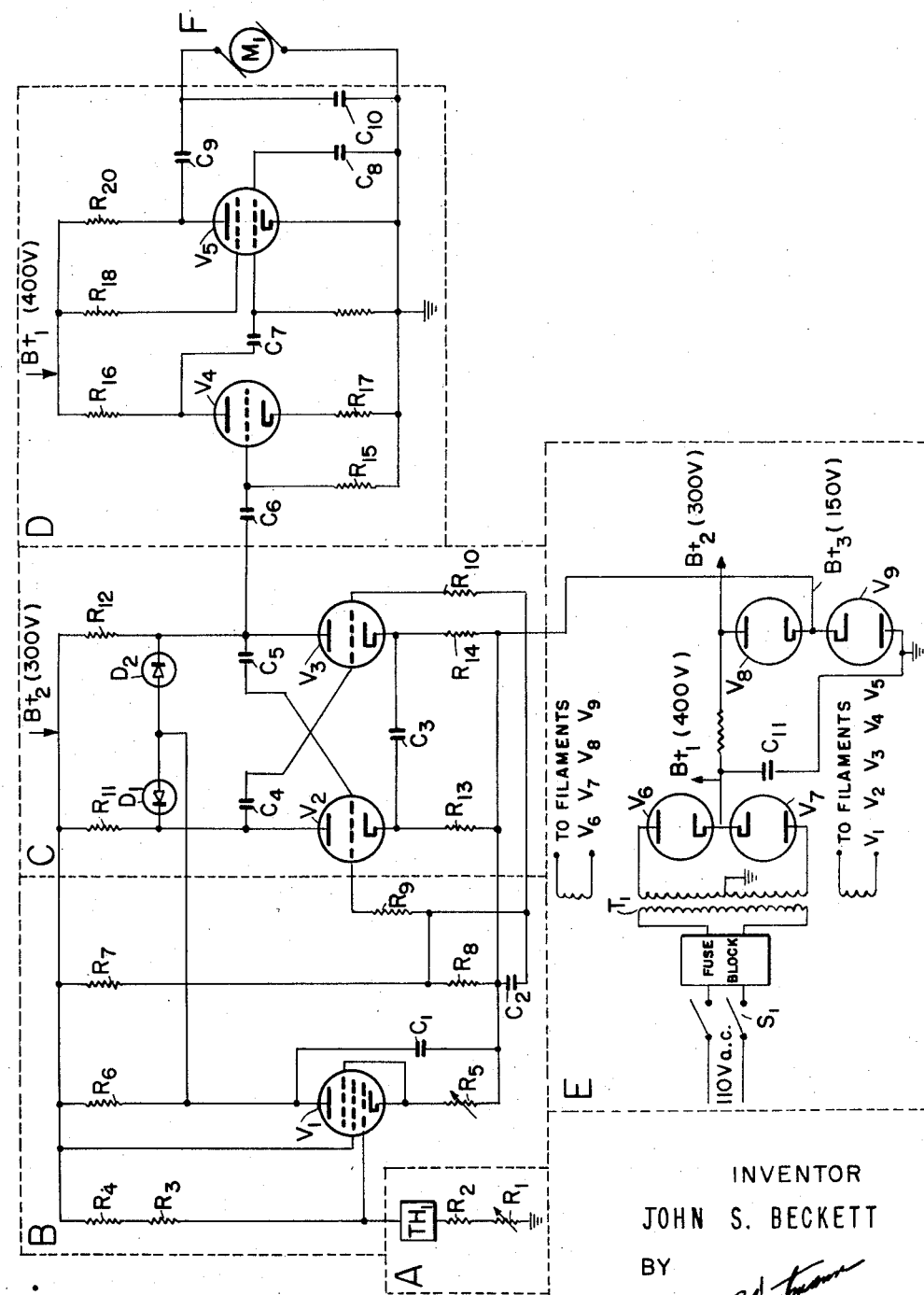
Fig. 2 is an electrical circuit diagram of a preferred form of my invention.

An electrical circuit diagram of a preferred embodiment of my invention is shown in Fig. 2, this including a temperature sensitive element $Th_1$ whose conductivity varies exponentially with the temperature, and a synchronous electric clock motor $M_1$ which actuates an alarm or a synchronous powered servo-mechanism indicated generally as F.

Since the sensing element $Th_1$ in this case undergoes changes in conductivity, this produces a corresponding variable direct current signal voltage by the pentode tube $V_1$ and the associated resistance network as shown in the diagram.

The electronic amplifier D is of a conventional type, receiving the variable frequency output of the multivibrator and amplifying it as desired.

The power supply unit E for the oscillator C and the amplifier D is of conventional form for supplying plate and filament current, the filament and B+ circuits being indicated only for clarity in the diagram.

The astable multivibrator or oscillator C consists of a pair of vacuum tube triodes $V_2$ and $V_3$, a pair of clamping gas diodes $D_1$ and $D_2$ adapted to apply voltage to each of the plate circuits of the triodes, with resistance and capacity networks including $R_{11}$ and $R_{12}$, $C_4$ and $C_5$, $C_3$, $R_{13}$ and $R_{14}$ arranged to include the respective plates and grids of the two triodes as described in detail below.

The astable multivibrator or oscillator C of this invention is based upon transient circuit phenomena, specifically with the voltage decay in a resistance-capacitance (RC) circuit. In such a circuit, the potential drop across the condenser, when either discharging or charging is:

$$E_c = E(1 - e^{-t/RC}), \text{ or } E_c = E e^{-t/RC}$$

where

E is applied voltage,
$e$ is Naperian base,
$t$ is time,
R is resistance,
C is capacity.

Figure 3:
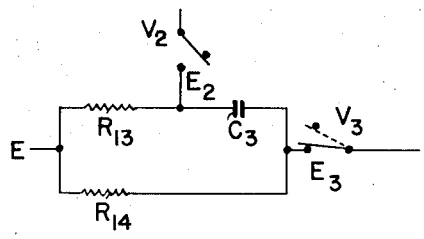
Fig. 3 is an explanatory diagram of an RC network with reversing switching.
Figure 4:
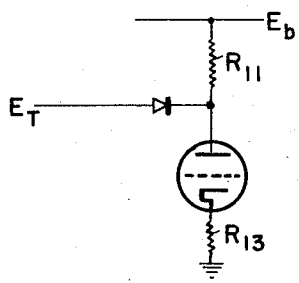
Fig. 4 is an explanatory portion of an RC network and reversing switch arrangement including a vacuum triode tube.
Figure 5:
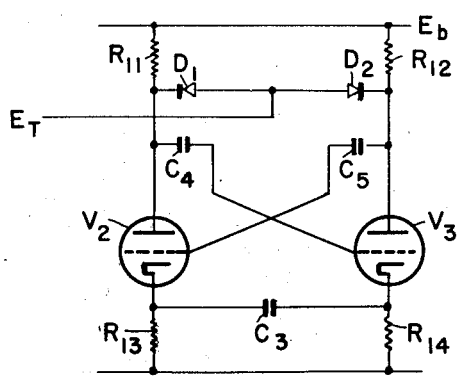
Fig. 5 is an oscillator circuit with twin triode tubes and clamping diodes in the direct current control circuit.

The operation may be better understood by reference to Figs. 3, 4, and 5 showing illustrative circuits.

Referring to Fig. 3, an applied D.C. voltage E supplies current to either of two outlets, $V_2$ and $V_3$, through an RC network. Assume that immediately after an initial period during which switch $V_2$ has been closed and $V_3$ open, the switches are instantaneously reversed, i.e., $V_2$ is now open and $V_3$ closed. At the instant of reversal, $E_3$ becomes equal to the applied voltage E less the IR drop through $R_{14}$; $E_2$ becomes equal to the full applied voltage E. As current starts to flow through the upper RC arm of the network, $E_2$ falls exponentially in accordance with the equation above, its rate of fall depending on the value of $R_{13} \times C_3$.

Now referring to Fig. 4, which is a simple tube circuit with resistance elements connecting the tube to the plate supply and to ground. With no current flowing through the tube, the plate voltage is identical with the plate supply $E_b$. As current starts to flow, the plate voltage falls to $E_b$ less the IR drop through $R_{11}$ to reach the value $E_{11}$. If an outside source of voltage $E_T$ is now applied, with a value somewhere between $E_b$ and $E_{11}$, the plate voltage during operation cannot fall below $E_T$.

These two basic circuit elements may be applied in an astable multivibrator circuit whose rate of voltage decay or basic period is defined, as in Fig. 3, by the network $R_{13}$, $R_{14}$, $C_3$, but whose actual period may be set at will by an external applied voltage $E_T$. Referring now to Fig. 5 showing a twin triode tube circuit with clamping diodes, the operation of this circuit produces the wave forms in Fig. 6.

Figure 6:
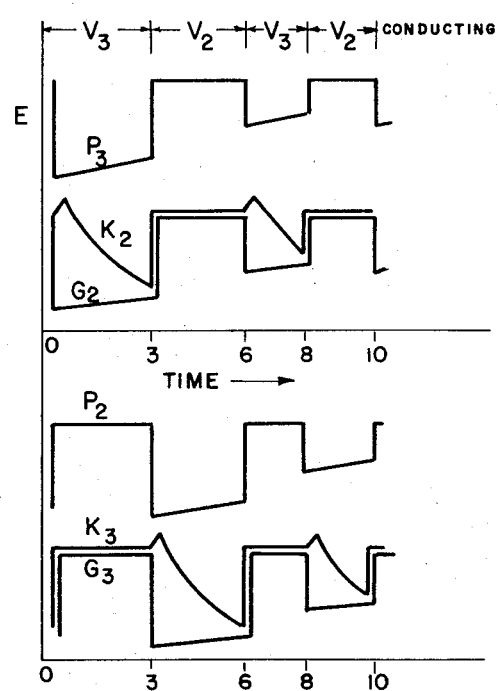
Fig. 6 is an explanatory diagram showing wave forms.

For example, Fig. 6 shows one complete cycle (from 0 to 6 on the time axis), with plate voltage swinging between 150, the plate supply, and 90, the limiting applied voltage $E_{T1}$; and one complete cycle (from 6 to 10 on the time axis) with plate voltage swinging between 150 and 120, the limiting applied voltage $E_{T2}$. The resulting wave forms clearly show how the oscillation period of the circuit is regulated and controlled by the external applied voltage $E_T$.

Assume that initially the tube $V_2$ has been conducting and $V_3$ idle, and that at time, $t=0$, the switchover occurs so that now $V_3$ is conducting and $V_2$ idle. The next switchover occurs at $t=3$, so that from 3 to 6, $V_2$ is again conducting with $V_3$ idle. The complete cycle from 0 to 6 is operating with applied voltage $E_{T1}=90$. The next complete cycle, from 6 to 10, is identical, but with $E_T=120$. In this Fig. 6 the plate, cathode and grid are identified respectively by P, K and G, with subscript number to identify the tubes $V_2$ and $V_3$.

The sequence of events which occurs during the switchover are as follows: With $V_3$ conducting at time O, $P_3$ immediately drops from 150 to its limiting value of 90 volts. This is reflected through the cross linkage of $C_5$ (Fig. 5) to $G_2$. $G_2$ drops from its value of 70 to 10 volts. Since $K_2$ is still slightly above 70 volts, $V_2$ is no longer conducting. As a result of $V_2$ not conducting, $P_2$ rises to its maximum of 150. This interdependent series of events occurs almost simultaneously.

The cathode voltage $K_2$ is now in the same situation as $E_2$ in Fig. 3. $V_2$ is now an open circuit, so that $K_2$ falls exponentially in accordance with the equation above, and the values of $R_{13}$ and $C_3$. When $t$ is approximately equal to 3, its potential falls to within around 10 volts of $G_2$, in other words to around 20 volts, the barrier to electron flow from $K_2$ to $P_2$ vanishes and current starts to flow through $V_2$. As $V_2$ starts to conduct, $P_2$ falls from 150 to 90, causing $G_3$ to fall from 70 to 10 and $V_3$ now ceases to conduct. If no change is made in the circuit constants, this cycling will continue repeatedly with the oscillation period depending on the time required for the cathode to fall from 70 to 20 volts, thus approaching the voltage of $G_2$ the grid.

The circuit timing may be changed by introducing variable values for the elements in the $R_{13}$, $R_{14}$, $C_3$ network so as to change the slope of fall of the cathode voltage. It is much simpler, however, to raise the lower value of the grid from 10 volts to whatever value is desired. In this way, less time will be required for the falling cathode voltage to meet that of the grid, and the oscillation period will be shortened. This is done in the cycle from 6 to 10. The external applied voltage $E_{T2}$ is now 120 volts; the plate voltage falls from 150 to only 120; the grid voltage falls from 70 to only 40 volts; and the cathode, still falling at the same rate as before, reaches the critical value of 50 (10 volts above the grid's 40) in a shorter time. Thus, with applied voltage $E_{T1}$ at 90, we have an oscillation period of 6 time units; with this voltage $E_{T2}$ at 120, we have a period of only 4 time units.

In the electrical circuit diagram showing a preferred form of my invention, as shown in Fig. 2, in which the sensing device is a temperature sensitive element whose conductivity varies exponentially with the temperature, the several components have values as follows: the pentode tube V, used in the converter section is 6CB6; the triode tubes used were: $V_2$ and $V_3$, ½–12AU7; $V_4$, ½–6J6; $V_5$, 6V6GT; $V_6$ and $V_7$, 5Y3GT; and $V_8$ and $V_9$, OA2. The potentiometer resistors were carbon type, $R_1$ being 100K and $R_5$ being 1K. The resistors used were: $R_2$ and $R_4$ were 470K, and $R_3$ was 47K; $R_7$, $R_8$, $R_9$, $R_{10}$, $R_{11}$, $R_{12}$, $R_{13}$, $R_{14}$, $R_{15}$, $R_{16}$, $R_{17}$, and $R_{19}$ were ½ w.; $R_{18}$ and $R_{21}$, 2 w.; and $R_{20}$, 10 w. (wirewound). The condensers used were: $C_1$, $C_2$, $C_6$, $C_7$, and $C_8$, 1 mf., 450 v.; $C_3$, .3 mf., 450 v.; $C_4$, $C_5$, and $C_{10}$, .05 mf., 450 v.; $C_9$ and $C_{11}$, 10 mf., 450 v. An R11A triad transformer was used for $T_1$. The temperature sensing element was a "Thermistor 71A2" made by Victory Engineering Company.

The foregoing embodiment of my invention uses an electrical signal from a process operational condition or conditions to control the speed of a motor. I do not, however, limit this invention solely to this specific embodiment. The motor speed may be controlled by a variety of means, for example by varying the field current of a simple D.C. motor; by applying a brake to the motor's armature shaft; by varying the armature current in a motor with constant load, etc. Various converter means may be used for converting the given input signal or signals from varying operational conditions into an output signal of suitable form for controlling the speed of the timing means. For example, if the varying condition is temperature, the signal may come from a thermocouple, a thermistor, or from an expanding bellows. The first two named signals are electrical and may be used as such. The third signal is one of motion and may be used directly in mechanical transmission or through a transistor to produce a corresponding electrical signal. If the varying condition is pressure, I may use direct mechanical transmission or, through a transistor, convert the signal into an electrical signal.

In addition to merely controlling the overall elapsed time of a process, the timing mechanism may, through a program cam or other equivalent device, operate various requisite operational steps during the life of the process, such as opening or closing valves, turning power on or off, etc. Such a type of program timing may be applied to any part of the process where the timing of an operational step is dependent on the corresponding variation in the variable operating condition or conditions.

This invention provides means for timing processes to produce optimum processing results where a plurality of operational conditions such as temperature, pressure, rate of flow, electrical current, voltage influence the processing results. In this case, an integrating computing device, such as an analog computer, integrates the signal voltages of a plurality of sensing devices and applies to the oscillator the integrated voltage controlling the frequency of the output, resulting in governing the rate of turning of the servo-mechanism, or signalling the end of processing time to produce optimum results.

Figure 7:
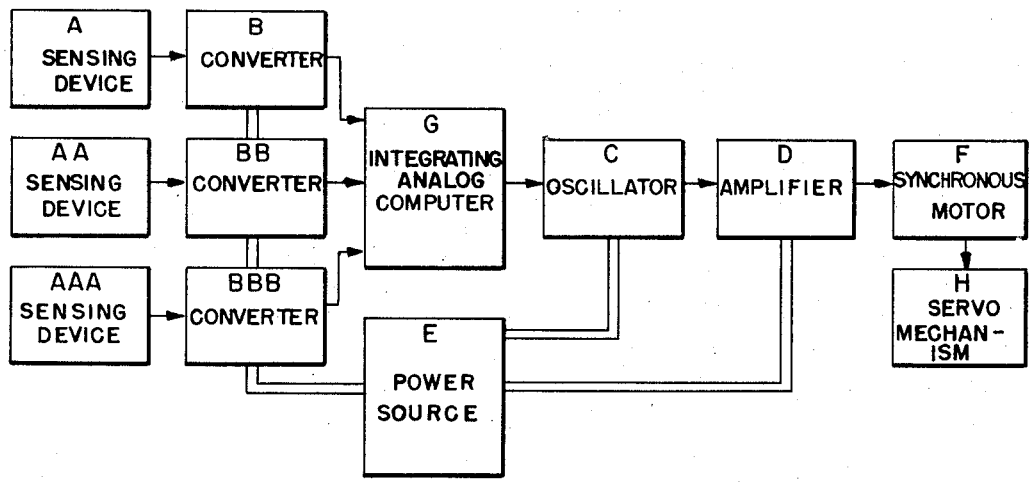
Fig. 7 is a diagram of compensating timer means including multiple sensing devices.

In Fig. 7 is shown a system similar to that of Fig. 1 in which multiple sensing devices A, AA, and AAA, each deliver signals to their respective converters B, BB, and BBB, which in turn deliver electrical signals to an integrating analog computer G, which delivers an integrated electrical voltage to the oscillator C and amplifier D, whose thus controlled output frequency governs the turning rate of the synchronous motor F and the servo-mechanism H.

I claim:
1. A compensating timer comprising a variable resistance temperature sensing element whose conductivity varies exponentially with the temperature; amplifier means for producing a direct current voltage proportional to said conductivity; an astable multivibrator circuit generating a current whose frequency at the output is varied by said signal; and synchronous motor means connected to said output, the speed of said motor means varying with the change of frequency of said output current.

2. The compensating timer comprising a condition sensing element producing signals having variable direct current voltages; an electronic oscillator means generating a current whose output frequency is controlled by said signal, said means comprising an astable multivibrator having a pair of triode vacuum tubes connected in balanced dual resistance-capacitance networks with clamping diodes connected to the respective plates of said triode tubes, whereby to generate output frequencies corresponding to the signals of said condition sensing element; and synchronous motor means connected to said output.

3. A compensating timer comprising a condition sensing element generating a signal of variable magnitude; means for changing said signal to direct current voltage of corresponding magnitude; an astable multivibrator circuit generating a current whose frequency at the output is varied by said signal voltage; and synchronous motor means connected to said output, the speed of said motor means varying with the change of frequency of said output current; said astable multivibrator comprising a pair of triode tubes interconnected in balanced dual resistance-capacitance networks with clamping diodes connected to the respective plates of said triode tubes, whereby to generate output frequencies corresponding to said voltage signal.

4. A compensating timer comprising a condition sensing element generating an electric signal of variable magnitude; means for changing said electric signal to direct current voltage of corresponding magnitude; an astable multivibrator circuit generating a current whose frequency at the output is varied by said signal; an electronic amplifier for said output; and synchronous motor means connected to said output, the speed of said motor means varying with the change of frequency of said output current; said astable multivibrator comprising a pair of triode tubes interconnected in balanced dual resistance-capacitance networks with the grid of one triode tube connected through a capacitor with the plate of the other triode tube, and clamping diodes connected to the respective plates of said triode tubes, whereby to generate output frequencies corresponding to said voltage signal.

References Cited in the file of this patent
UNITED STATES PATENTS

| | | |
|---|---|---|
| 2,385,641 | Peterson | Sept. 25, 1945 |
| 2,676,512 | Krasno | Apr. 27, 1954 |